United States Patent Office 2,820,058
Patented Jan. 14, 1958

2,820,058

PRODUCTION OF KETENE

Oren V. Luke, Jr., Max O. Robeson and Wallace E. Taylor, Corpus Christi, Tex., assignors to Celanese Corporation of America, New York, N. Y., a corporation of Delaware No Drawing. Application June 15, 1953
Serial No. 361,864

6 Claims. (Cl. 260—585.5)

This invention relates to the production of ketene and relates more particularly to an improved process for the production of ketene by the catalytic pyrolysis of acetic acid.

An important object of this invention is to provide an improved process for the production of ketene by the catalytic pyrolysis of acetic acid which will produce a maximum yield of the desired product with a minimum of decomposition.

A further object of this invention is to provide a process for the production of ketene by the catalytic pyrolysis of acetic acid which may be carried out under such conditions of operation as to permit the use of relatively simple equipment.

Other objects of this invention will be apparent from the following detailed description and claims.

Ketene, a valuable intermediate for the synthesis of organic compounds, has long been produced by the vapor phase pyrolysis of acetic acid at subatmospheric pressures. Such a process, in commercial application, imposes problems in the design and maintenance of equipment suitable for operation at subatmospheric pressures and capable of handling high gas velocities at high temperatures, followed by rapid cooling and separation of gas and liquid streams in order to separate the ketene from the reaction mixture. It is also difficult in such a system to obtain ketene free of acetic acid and water vapor because of the increased partial pressure of these latter substances at subatmospheric pressures. Furthermore, in order to utilize the ketene obtained in this manner, it is generally necessary to compress the ketene to atmospheric pressure or above, during which compression there is the danger of the polymerization of the ketene to undesirable by-products.

According to the present invention, it has been found that ketene may be obtained in high yields by the vapor phase catalytic pyrolysis of acetic acid at pressures ranging from atmospheric to about 20 pounds per square inch if the conditions during the pyrolysis are controlled closely. In carrying out the pyrolysis, acetic acid is vaporized and is introduced into a reactor, the nature of which will be set forth below, which is maintained at a temperature of between about 625 and 750° C. and at a pressure of between atmospheric and about 20 pounds per square inch gauge. There is also introduced into the reactor a suitable pyrolysis catalyst such as a phosphate. The vapors are caused to flow through the reactor at such a rate that they remain therein for between about 0.01 and 5.0 seconds, but preferably between 0.5 and 3.0 seconds. For a given yield, temperature is an inverse function of contact time. There is then introduced into the reaction mixture a substance, such as ammonia, which will neutralize the catalyst and retard recombination of the ketene with reacted acetic acid and also with the water formed during the reaction. The exit gases are then rapidly cooled and the ketene, which remains in gaseous form, is separated from the liquid products rapidly as, for example, in a cyclone separator. The ketene may, if desired, be further cooled to 0° C., or less, by means of refrigerated condensers or the like to free the ketene of all but trace quantities of water and acetic acid.

The material from which the reactor is constructed is critical since many materials such as nickel, chromium and iron will cause the ketene to be converted to other substances if they are brought into contact with the hot reaction mixture or will fail to withstand the high reaction temperature. It has been found that steels containing between about 3 and 4% of molybdenum and between about 17 and 20% chromium and 8 to 12% nickel as major alloying metals will not cause the conversion of the ketene into other, less desirable substances. Suitable steels of this type are, for example, types 316 or 317 stainless steel. The reactors should be designed and constructed to have good heat transfer properties with small temperature differential between wall and gas, thereby minimizing degradation of the ketene at the wall.

To obtain a maximum yield of ketene, it is also desirable that the condensers for cooling the hot reaction gases and separating the ketene from the liquid materials in said gases should have a high surface to volume ratio and a high heat transfer coefficient. In general, good results have been obtained by employing condensers in which there is at least about 140 and preferably from about 140 to 180 square feet of surface of each cubic foot of volume.

In carrying out the foregoing process, there is obtained, in addition to the desired ketene, a certain proportion of acetic anhydride, presumably by reaction of the ketene with acetic acid. This lowers the net efficiency of the process, as calculated on the production of ketene. Therefore, according to another feature of the present invention, there is added to the feed stock a certain proportion of acetic anhydride, preferably by recycling the acetic anhydride that is formed by the reaction. It is found that by having present in the feed stock a certain proportion of acetic anhydride, the conversion of acetic acid to acetic anhydride is substantially reduced. As a result, in a recycle system, a steady state will be reached in which no net change in the quantity of acetic anhydride will occur. Under these conditions, all the acetic acid, will, in effect, be converted to ketene.

After the ketene has been separated from the unreacted acetic acid, and the acetic anhydride and water formed during the reaction by cooling, the condensed liquid is distilled with a suitable azeotroping agent such as benzene or hexane to remove the water and the residue is recycled to the reactor along with fresh acetic acid feed.

Pyrolysis catalysts other than triethyl phosphate that may be employed in carrying out the reaction include, for example, diammonium phosphate, tri-cresyl phosphate or other esters of phosphoric acid. The pyrolysis catalyst may be added in amounts ranging from about 0.2 to 0.5% by weight, based on the weight of the feed stock. Neutralizing materials other than ammonia that may be added to the reaction mixture when it emerges from the reactor include, for example, pyridine, aniline or suitable aliphatic amines. The neutralizing agent should be added in amounts sufficient to neutralize the pyrolysis catalyst or, preferably, a slight excess. If desired, the catalyst may comprise a salt of a volatile base such as ammonium phosphate, dimethyl ammonium phosphate or pyridinium phosphate, in which case the neutralizing agent will be present in the reaction mixture as it emerges from the reactor.

The following examples are given to illustrate this invention further.

*Example I*

Acetic acid feed stock containing 0.3% by weight of triethyl phosphate is fed continuously at the rate of 454 parts per hour to a vaporizer and preheated to 550° C. The vapors are then introduced into a reactor of type 317 stainless steel operating at atmospheric pressure and at a temperature of 680° C. The flow rate is such, as compared to the size of the reactor, that the vapors remain in the reaction zone for 1.2 seconds. A stream of ammonia is injected into the hot gases as they leave the reactor at the rate of 3 parts by weight of ammonia per hour. The hot gases are then cooled rapidly to 50° C. in a condenser having a cooling area of 141 square feet for each cubic foot of volume and the ketene is separated from the liquid products in a cyclone separator. The ketene is then cooled further to remove traces of water and acetic acid therefrom. There is obtained a yield, on an hourly rate, of 119.5 parts by weight of ketene, 80 parts by weight of acetic acid and 121 parts of acetic anhydride. In addition, there are obtained 18 parts by weight of vent gas per hour, which gas comprises degradation products of ketene and acetic acid. The conversion of acetic acid to moles of ketene isolated is 38% and the overall efficiency is 92.5%.

Similar results have been obtained with pressures up to 20 pounds per square inch gauge.

*Example II*

A mixture of approximately 50% by weight of acetic acid and 50% by weight of acetic anhydride containing 0.3% by weight of triethyl phosphate is fed continuously at the rate of 714 parts per hour to a vaporizer and preheated to 500° C. The vapors are then introduced into a reactor of type 317 stainless steel operating at atmospheric pressure and at a temperature of 690° C. The flow rate is such, as compared to the size of the reactor, that the vapors remain in the reaction zone for 0.15 second. A stream of ammonia is injected into the hot gases as they leave the reactor at the rate of 4.5 parts by weight of ammonia per hour. The hot gases are then cooled rapidly to 100° C. in a condenser having a cooling area of 141 square feet for each cubic foot of volume and the ketene is separated from the liquid products in a cyclone separator. The ketene is then cooled further to remove traces of water and acetic acid therefrom. Under these conditions, there is fed, during a period of 42 minutes, 268 parts by weight of acetic acid and 261.5 parts by weight of acetic anhydride. There is obtained a yield of 134.2 parts by weight of ketene, 96.8 parts by weight of acetic acid and 210.4 parts by weight of acetic anhydride. In addition, there is obtained 9.3 parts by weight of vent gas. There is a net conversion of feed to ketene of 33.4%, together with an apparent conversion of acetic acid to ketene of 60.6% and an apparent conversion of acetic anhydride to ketene of 19.5%. The efficiency is 94%. The acetic acid and acetic anhydride produced are recycled together with fresh feed and, when equilibrium is reached, no further additions of acetic anhydride are required. At this point, the feed contains approximately 60% by weight of acetic acid and 40% by weight of acetic anhydride.

Similar results are obtained when the pressure is increased to 16 pounds per square inch gauge.

It is to be understood that the foregoing detailed description is given merely by way of illustration and that many variations may be made therein without departing from the spirit of our invention.

Having described our invention, what we desire to secure by Letters Patent is:

1. In a process for the production of ketene by vapor phase pyrolysis, the steps which comprise passing the vapors of acetic acid and a pyrolysis catalyst through a reactor comprising steel alloy containing between about 3 and 4% of molybdenum, between about 17 and 20% of chromium and between about 8 and 12% of nickel, and maintained at a pressure of up to about 20 pounds per square inch gauge, at a temperature of between about 625 and 750° C., and controlling the flow so that the vapors remain in the reactor between about 0.01 and 5.0 seconds.

2. In a process for the production of ketene by vapor phase pyrolysis, the steps which comprise passing the vapors of acetic acid and a pyrolysis catalyst through a reactor comprising steel alloy containing between about 3 and 4% of molybdenum, between about 17 and 20% of chromium and between about 8 and 12% of nickel, and maintained at a pressure of between atmospheric and about 20 pounds per square inch gauge, at a temperature of between about 625 and 750° C., and controlling the flow so that the vapors remain in the reactor between about 0.01 and 5.0 seconds.

3. In a process for the production of ketene by vapor phase pyrolysis, the steps which comprise passing the vapors of acetic acid and a pyrolysis catalyst through a reactor comprising a steel alloy containing between about 3 and 4% of molybdenum, between about 17 and 20% of chromium and between about 8 and 12% of nickel, and maintained at a pressure of between atmospheric and about 20 pounds per square inch gauge, at a temperature of between about 625 and 750° C., controlling the flow so that the vapors remain in the reactor between about 0.01 and 5.0 seconds whereby there is obtained a mixture of hot gases containing ketene, adding a neutralizing agent for the pyrolysis catalyst to the hot gases as they emerge from the reactor, rapidly cooling the hot gases as they emerge from the reactor in a condenser having at least about 140 square feet of surface for each cubic foot of volume, and recovering the ketene.

4. In a process for the production of ketene by vapor phase pyrolysis, the steps which comprise passing a mixture of acetic acid, acetic anhydride and a pyrolysis catalyst through a reactor comprising a steel alloy containing between about 3 and 4% of molybdenum, between about 17 and 20% of chromium and between about 8 and 12% of nickel and maintained at a pressure of between atmospheric and about 20 pounds per square inch gauge, at a temperature of between about 625 and 750° C., and controlling the flow so that the vapors remain in the reactor between about 0.01 and 5.0 seconds whereby there is obtained a mixture of hot gases containing ketene.

5. In a process for the production of ketene by vapor phase pyrolysis, the steps which comprise passing a mixture of acetic acid, acetic anhydride and a phosphate pyrolysis catalyst through a reactor comprising a steel alloy containing between about 3 and 4% of molybdenum, between about 17 and 20% chromium, and between about 8 and 12% nickel and maintained at a pressure of between atmospheric and about 20 pounds per square inch gauge, at a temperature of between about 625 and 750° C., controlling the flow so that the vapors remain in the reactor between about 0.01 and 5.0 seconds thereby forming a mixture of hot gases containing ketene and phosphate, adding ammonia to the hot gases as they emerge from the reactor to neutralize the phosphate, and rapidly cooling the hot gases as they emerge from the reactor in a condenser having between about 140 and 180 square feet of surface for each cubic foot of volume.

6. In a process for the production of ketene by vapor phase hydrolysis, the steps which comprise passing a mixture of acetic acid, acetic anhydride and triethyl phosphate through a reactor of type 317 stainless steel maintained at atmospheric pressure and at a temperature of 690° C., controlling the flow so that the vapors remain in the reactor for 0.15 second, adding ammonia to the hot gases as they emerge from the reactor to neutralize the phosphate, cooling the hot gases as they emerge from the reactor to a temperature of 100° C., in a condenser having a cooling area of 141 square feet for each cubic foot of volume, separating ketene from the hot gases, and recycling acetic anhydride from the gases through the reactor with fresh acetic acid.

References Cited in the file of this patent

UNITED STATES PATENTS

| | | |
|---|---|---|
| 2,249,527 | Hull | July 15, 1941 |
| 2,393,778 | Hull | Jan. 29, 1946 |
| 2,537,079 | Nicolai et al. | Jan. 9, 1951 |
| 2,542,517 | Hemminger | Feb. 20, 1951 |